Patented July 3, 1945

2,379,482

UNITED STATES PATENT OFFICE 2,379,482

RUBBER COMPOSITIONS

Per K. Frolich, Westfield, N. J., assignor, by mesne assignments, to Jasco, Incorporated, a corporation of Louisiana No Drawing. Application October 18, 1939, Serial No. 299,964

4 Claims. (Cl. 260—36)

This invention relates to improvements in the manufacture of rubber compositions and especially in the manufacture of rubber compositions that are soft and plastic enough to be readily incorporated with dry compounding ingredients.

Crude raw rubber is tough and non-plastic and before it will absorb compounding ingredients it is masticated on a mill or in a mixer until it becomes plastic. Mastication of rubber is obtained by mechanically kneading, either by passing between rollers running at variable speeds to subject the rubber to compression followed by a shearing action, or by mixing in an enclosed mixer to produce the same effect. Either of these methods requires a prolonged period of time and another disadvantage is that great heat is thereby generated.

An object of this invention is to provide a complex organic material which when added to raw rubber will reduce the period of time required for mastication to soften the rubber.

Another object of the invention is to provide a complex organic material that on being added to rubber will not only serve as a rubber softener, but also otherwise improve rubber as hereinafter disclosed.

The complex organic materials are phenolic compounds which are recovered from certain petroleum fractions and hereafter are to be referred to as "petroleum phenols."

The petroleum phenols are recovered from petroleum oils and mainly from cracked petroleum naphtha distillates and heating oil stocks. A petroleum fraction, such as a heating oil stock, is generally treated with a strong aqueous caustic solution. This treatment produces a dark viscous material insoluble in caustic which settles out of the heating oil with the excess caustic and is then separated from the petroleum fraction. The intermediate layer formed in the above extraction and consisting of the crude sodium phenate salts in alkaline solution is separated from the top heating oil layer and is washed with petroleum ether or naphtha to remove residual hydrocarbons. The solution of the salts is then treated with carbon dioxide or a weak mineral acid in sufficient quantity to liberate only the phenols from the salts, any naphthenic acid salts being thus kept undissociated in the solution. The liberated phenols are separated from the solution and may then be purified by distillation, preferably under reduced pressure, or by blowing with air. If desired, the phenols may be further purified by redistillation under vacuum. The boiling range of the phenols finally recovered is generally higher than the boiling range of the petroleum fraction from which they are obtained. With sufficient treatment and redistillation, the phenolic compounds can be substantially freed from hydrocarbons and other impurities such as naphthenic acids.

The following example illustrates the means used for obtaining these phenols:

Example 1

A sample of acid treated heating oil from East Texas crude was contacted in an agitator with .15 pound per barrel of 40° Bé. caustic soda. Three layers were formed, of which the bottom layer was the caustic soda which could be reused, the intermediate layer, dark in color, contained the phenols, and the top layer was the caustic-washed oil. The intermediate layer was extracted three times with 10% by volume of naphtha and then acidified with either carbon dioxide or dilute acid for the precipitation of the phenols. Approximately 0.16% of crude phenols, based on the heating oil treated, was obtained. Inspections of these crude phenols were as follows:

| | |
|---|---|
| Gravity—API | 6.8 |
| Color (Robinson) | Black |
| Percent Water | 20 |

| Distillation—A. S. T. M.: | °C. |
|---|---|
| Initial boiling point | 98.9 |
| 5% off at | 102.2 |
| 10% off at | 102.2 |
| 20% off at | 110.0 |
| 30% off at | 218.3 |
| 40% off at | 230.6 |
| 50% off at | 238.9 |
| 60% off at | 250.0 |
| 70% off at | 265.0 |
| 80% off at | 284.4 |
| 90% off at | Cracked |
| 95% off at | Cracked |

The crude phenols were then vacuum distilled, the initial boiling point being about 30° C. at 5 mm. pressure. Various cuts were taken off up to about 240° C. at 5 mm. pressure; the residue remaining in the still was a hard, tar-like solid. A sample of such phenols was fractionated and refractionated three times, the following fractions of the specified carbon hydrogen proportions being obtained in the last fractionation:

| Fraction | Boiling range, °C. at 2 mm. pressure | Per cent C. | Per cent H. |
|---|---|---|---|
| 1 | 30–70 | | |
| 2 | 70–80 | | |
| 3 | 80–90 | 78.7 | 9.06 |
| 4 | 90–100 | 78.89 | 9.36 |
| 5 | 100–110 | | |
| 6 | 110–120 | 78.98 | 9.55 |
| 7 | 120–130 | 79.38 | 9.35 |
| 8 | 130–140 | | |
| 9 | 140–150 | 79.6 | 9.23 |
| 10 | 150–160 | | |
| 11 | 160–170 | 79.99 | 9.3 |
| 12 | 170–180 | | |
| 13 | 180–210 | 80.86 | 8.87 |

The petroleum phenols may be characterized as containing a total of about 9 to 23 carbon atoms per molecule with about 3 to 17 of these carbon atoms present in saturated hydrocarbon groups, which show a hydrogen deficiency as compared to the hydrogen content of straight chain alkyl groups. This deficiency of hydrogen can be ascribed to the presence of cyclo-aliphatic hydrocarbon groups. Thus, while the saturated hydrocarbon substituents of petroleum phenols may be considered as paraffinic, they do not have the paraffinicity of simple alkyl groups. Moreover, analysis of fractions of these phenolic substances shows that they contain more oxygen than could be accounted by the phenolic group, as can be seen from the following analytical data:

A sample of petroleum phenols was fractionated into four portions and the following cuts obtained:

| Fraction | Boiling range, °C. | Per cent C | Per cent H |
|---|---|---|---|
| 1 | 85–120 at 6 mm. | 79.09 | 9.06 |
| 2 | 120–130 | 79.35 | 9.16 |
| 3 | 130–140 | 78.19 | 8.82 |
| 4 | 140–150 | 80.66 | 8.54 |

Fraction 3 on further analysis was found to contain more oxygen as shown by the following analysis:

Per cent carbon _____ 78.19
Per cent hydrogen _____ 80.82
Probable empirical formula _____ $C_{12}H_{16}O_{1.5}$
Molecular weight (calc.) _____ 184
Molecular weight (found) _____ 190.3
Sap. number of acetylated product (calc.) __ 340
Sap. number of acetylated product (found) _____ 256.67

It can be seen that if the oxygen atoms were phenolic, the acetylated product would have a saponification number of 340 mg. of KOH/gm. If only one of the oxygen atoms per molecule were phenolic the saponification number would be 246 which is in agreement with the value of 256 as found in the analysis.

In the case of heavier distillates, such as lubricating oil and heavier oils, the use of aqueous alkali solutions does not remove all of the phenolic bodies and it is necessary to treat with an alcoholic solution of strong alkali. Solvents other than monohydric alcohols (methyl, ethyl, isopropyl alcohols, etc.) may be used; e. g. glycols, glycerols, polyglycols, dioxane, glycol or glycerol mono-esters, or similar substances.

Excessive amounts of water should be avoided in such solvents, that is, only sufficient water should be added so that the solvent and the petroleum hydrocarbons readily separate. In some instances, 5% of water will be sufficient. The amount of alkali employed should vary from 3 to 15% or more of the amount of solvent used, depending upon the concentration of the phenolic products and the type of stock being treated. About 1 to 10% by volume (on the oil treated) of the total solvent is generally used in the extraction. The preferred temperature is room temperature, although temperatures as low as −30° C. and up to 100° C. may be used. Countercurrent extraction is preferable.

The following example illustrates the extraction of phenols from heavy distillates:

Heavy Talang Akar kerosene (15 gallons), which has been previously treated with aqueous alkali and which boils substantially above 500° F., is extracted with one-half gallon of methyl alcohol containing one-half pound of potassium hydroxide. The mixture is centrifuged, the alcohol layer is distilled, and upon acidification of the distillation residue 128 grams of crude phenols are recovered. These are vacuum distilled at 5–8 mm. presure.

The phenolic compounds so obtained are generally liquid mixtures varying in viscosity and boiling point, the values of these properties increasing with increase in boiling point of the petroleum source of material. These phenols contain from about 10 carbon atoms per molecule to 27 carbon atoms or more.

In the higher boiling fractions, there is a deficiency in hydrogen which indicates the presence of more than one nucleus or condensed nuclei.

According to this invention, these complex petroleum phenols are used to soften rubber compositions. When rubber is treated with 2 to 10%, preferably about 5%, of these petroleum phenols as such, reacted to form the corresponding triaryl phosphates or in the form of their metal soaps, the following advantageous results are obtained. The treated rubber is more plastic at both normal and elevated temperatures, and a benzene solution containing the added plasticizer has a marked decrease in viscosity when compared with a similar solution of rubber without the plasticizer.

These complex phenols when used in rubber compositions possess also an age-resisting or oxidation-inhibiting property. To illustrate, as a specific example of another embodiment of this invention, a rubber composition was made having the following formula:

| | Parts |
|---|---|
| Smoked sheets | 100 |
| Stearic acid | 1 |
| Paraffin | 1 |
| Titanium dioxide | 15 |
| Whiting | 30 |
| Zinc oxide | 50 |
| Sulfur | 3 |
| (Captax) mercaptobenzothiazole | 1.5 |

This base stock was divided into eight portions, one of which was used as a blank. To the remaining portions, 1% of each of the petroleum phenol cuts, boiling between 120° and 130° C. at 2 mm. pressure, 130° and 140° C. at 2 mm. pressure, and 140° and 150° C. at 2 mm. pressure, respectively, phenol bottoms, and of the commercial age-resisters, "Flectol H" (acetone-aniline reaction product), and "Agerite resin D" (polymerized trimethyldihydroquinoline), and of simple phenols was added, respectively. These compositions were then mixed separately in a rubber mill and, after thorough mixing, were vulcanized in a mold at 145° C. for 15 minutes to produce an optimum cure.

The relative rates of aging of the vulcanized compositions were compared by measuring their respective tensile strengths before and after aging. Accelerated aging tests were carried out in the Bierer-Davis bomb, in which the samples were maintained for 96 hours at 70° C. in an atmosphere of oxygen at a pressure of 300 pounds per square inch.

The following table presents the results obtained by the presence of a small amount of petroleum phenols in the rubber stocks as compared with those obtained by the presence of the commercially available products:

tillation at 6 mm. of a sample of mixed phenols obtained in a manner similar to that described under Example 1) and of the coal tar cresylic acids to separate portions of a rubber base stock. Results were as follows:

| Base stock | Parts |
|---|---|
| Smoked sheets | 100.0 |
| Zinc oxide | 5.0 |
| Sulfur | 3.0 |
| Stearic acid | 2.0 |
| Di-o-tolyl guanidine | 1.0 |

Cure: 60 min. at 141° C.

| Sample No. | Age resistor | Per cent age resistor | Original composition | | Composition after 72 hrs. Bierer-Davis bomb aging | |
|---|---|---|---|---|---|---|
| | | | Tensile strength, #/sq. in. | Per cent elong. | Tensile strength, #/sq. in. | Per cent elong. |
| 1 | Blank | | 3,150 | 730 | 100 | 350 |
| 2 | Petroleum phenols (B. P. 120°-130° C. at 6 mm.) | 2 | 3,100 | 776 | 200 | 460 |
| 3 | Petroleum phenols (B. P. 130°-140° C. at 6 mm.) | 2 | 3,300 | 750 | 1,100 | 560 |
| 4 | Petroleum phenols (B. P. 140°-150° C. at 6 mm.) | 2 | 2,300 | 650 | 450 | 450 |
| 5 | Barrett high boiling cresylic acids (B. P. 230°-250° C) [1] | 2 | 2,700 | 760 | 100 | 350 |

[1] Corresponds roughly to 100-120° C. at 6 mm.

*Effect of aging on tensile strengths of rubber compositions*

[Samples were aged for 96 hrs. in Bierer-Davis bomb]

| Material | Tensile strength before aging, lbs./sq. in. | Tensile strength after aging, lbs./sq. in. | Per cent loss in tensile strength |
|---|---|---|---|
| Blank | 3,050 | 2,420 | 20.5 |
| "Flectol H" | 2,390 | 2,000 | 16.3 |
| "Agerite resin D" | 2,680 | 2,180 | 18.6 |
| Phenol cut #7 | 2,450 | 2,220 | 9.4 |
| Phenol cut #8 | 2,635 | 2,230 | 15.4 |
| Phenol cut #9 | 2,445 | 1,975 | 19.3 |
| Phenol bottoms | 2,610 | 1,700 | 35.0 |

The differences in the above stocks after aging are very evident. Whereas the blank loses 20.5% of its tensile strength on aging, the same stock containing 1% of phenol cuts at 120°-130° C. and 130°-140° C. at 2 mm. pressure loses only 9.4% and 15.4% of its tensile strength respectively. These results are superior to those obtained with the commercially available products. Other proportions of the phenol cuts may be used from 0.1 to 10%.

The currently available age resisters cause discoloration of white or light-colored rubber when the rubber is exposed to sunlight or to a carbon-arc "Fadometer." The stocks which were tested for age resistance were exposed with one-half of the sample washed to a Fadometer for 16 hours. The following results were obtained:

| Sample | Appearance (staining) |
|---|---|
| Blank (base stock) | None. |
| "Flectol H" | Dark. |
| "Agerite resin D" | Very dark. |
| Phenol cut, boiling range 120-130 ° C. at 2 mm. pressure | Very light. |
| Phenol cut, boiling range 130-140 ° C. at 2 mm. pressure | Do. |
| Phenol cut, boiling range 140-150 ° C. at 2 mm. pressure | Light. |
| Phenol bottoms | Dark. |

In another set of runs, cuts of petroleum phenols were compared with a sample of coal tar phenolic bodies boiling in approximately the same boiling range. This was done by adding 2% of various phenol cuts (prepared by vacuum dis- It is apparent that the petroleum phenol cut, B. P. 130-140° C. at 6 mm., is quite effective as an age resistor, whereas the coal tar cresylic acid is not an age resistor.

The anti-oxidants of this invention appear to be unique in their ability not only to retard the loss in strength which accompanies aging but also to suppress the flex cracking of rubber without appreciably discoloring the rubber.

Although the anti-oxidants of this invention are useful in white or light-colored rubber because of their ability to retard age deterioration without danger of undue discoloration, they may obviously be used also to retard the age deterioration of dark-colored rubber compositions or of compositions consisting of or containing unvulcanized rubber, gutta-percha, balata, synthetic rubber or synthetic rubber-like materials such as polymers of butadiene, chloroprene, copolymers of diolefins and unsaturated nitriles which are formed by polymerization at 30° to 100° C., and co-polymers obtainable from other polymerizable compounds, such as diolefins and styrene, vinyl naphthalene, etc. Co-polymers, which are obtained by reacting a low molecular weight olefin with a low molecular weight diolefin at relatively low temperatures, namely, below 0° C., and preferably below −50° C. to −80° C. and even as low as −103° C., in the presence of a suitable metallic halide catalyst such as aluminum chloride dissolved in methyl or ethyl chloride, may also be stabilized against age deterioration by this means whether or not they have been admixed with fillers, pigments, vulcanizing agents, and the like.

The anti-oxidants of this invention may likewise be employed not only by mechanical incorporation into rubber but by application to its surface or by mixing with liquid dispersions of rubber such as latex and rubber cement, and may be employed either alone or together with other anti-oxidants, accelerators, solvents, pigments, and the like.

They may likewise be used to retard the deterioration of other oxidizable organic materials including soaps, aldehydes, essential oils, and the like by adding a suitable proportion, i. e. from 0.01% to 5% of these phenols.

I claim:

1. A composition of matter comprising a plastic-elastic substance of the class consisting of rubber, gutta-percha, balata and a synthetic rubbery high molecular weight conjugated diolefin polymer together with 0.1% to 10% of a petroleum phenol insoluble in aqueous caustic alkali and containing from 9 to 27 carbon atoms and non-phenolic, non-carbonyl oxygen in the molecule.

2. A composition of matter according to claim 1 in which the plastic-elastic substance is a synthetic rubbery high molecular weight conjugated diolefin polymer.

3. A composition of matter according to claim 1 in which the high molecular weight conjugated diolefin polymer is a polymer of butadiene.

4. A composition of matter according to claim 1 in which the plastic-elastic substance is rubber.

PER K. FROLICH.